United States Patent [19]

Sparrell

[11] Patent Number: 4,581,737

[45] Date of Patent: Apr. 8, 1986

[54] BIT COMPRESSION MULTIPLEXING

[75] Inventor: Duncan K. Sparrell, N. Hanover, N.J.

[73] Assignee: AT&T Bell Laboratories, Murray Hill, N.J.

[21] Appl. No.: 560,232

[22] Filed: Dec. 12, 1983

[51] Int. Cl.$^4$ .................................................. H04J 3/12
[52] U.S. Cl. .................................... 370/110.1; 370/118
[58] Field of Search ........................ 370/99, 105, 110.1, 370/118

[56] References Cited

U.S. PATENT DOCUMENTS

| | | | |
|---|---|---|---|
| 3,909,540 | 9/1975 | Maryscuk et al. | 370/110.1 |
| 4,059,731 | 11/1977 | Green et al. | 370/112 |
| 4,301,534 | 11/1981 | Genter | 370/105 |
| 4,358,845 | 11/1982 | de Passoz | 370/118 |
| 4,397,020 | 8/1983 | Howson | 370/105 |

OTHER PUBLICATIONS

"Pulse Code Modulation and Digital Transmission", *White Crescent Press Limited*, G. H. Bennett, 1976, pp. 33–35.

*Primary Examiner*—Joseph A. Orsino, Jr.
*Attorney, Agent, or Firm*—Thomas Stafford

[57] ABSTRACT

A bit compression multiplexer for a pair of time division multiplexed digital bit streams each one of which includes a plurality of PCM encoded signals deposited in separate and distinct channels and signaling bits multiplexed therewith. The encoded signals are bit compressed (22), and then multiplexed and grouped (25) into clusters. Each of the multiplexed compressed signals occupies a separate and distinct channel of a repetitive frame that includes a plurality of clusters and a corresponding number of additional channels, called delta channels, each one of which is associated with a given cluster and is proximate thereto. The signaling bits are extracted (21) from the pair of digital bit streams, reformatted (24) and then placed in predetermined bit positions of the delta channels. The signaling bits in a given delta channel are associated with the compressed signals of a cluster proximate thereto. The combination of a cluster and its related delta channel comprise a bundle. A framing bit pattern is developed (23) for each bundle and the framing bits are placed into a predetermined bit position of each of the delta channels (24). The framing bit pattern is arranged to detect frame slips which occur either at a transmitting bit compression multiplexer, at a receiving bit compression multiplexer or at other components of the transmission system, for example, at a Digital Access and Cross-connect System (DACS).

12 Claims, 7 Drawing Figures

| FRAME # | BIT # | | | |
|---|---|---|---|---|
| | 0 (S) | 1 (S/RA) | 2 (F) | 3 (D) |
| 1 | A1 | A2 | 0 | 1 |
| 2 | A3 | A4 | 1 | 1 |
| 3 | A5 | A6 | 0 | 1 |
| 4 | A7 | A8 | 1 | 1 |
| 5 | A9 | A10 | 0 | 1 |
| 6 | A11 | Y | 1 | 1 |
| 7 | B1 | B2 | 0 | 1 |
| 8 | B3 | B4 | 1 | 1 |
| 9 | B5 | B6 | 0 | 1 |
| 10 | B7 | B8 | 1 | 1 |
| 11 | B9 | B10 | 0 | 1 |
| 12 | B11 | Y | 1 | 1 |
| 13 | C1 | C2 | 1 | 1 |
| 14 | C3 | C4 | 0 | 1 |
| 15 | C5 | C6 | 1 | 1 |
| 16 | C7 | C8 | 0 | 1 |
| 17 | C9 | C10 | 1 | 1 |
| 18 | C11 | Y | 0 | 1 |
| 19 | D1 | D2 | 1 | 1 |
| 20 | D3 | D4 | 0 | 1 |
| 21 | D5 | D6 | 1 | 1 |
| 22 | D7 | D8 | 0 | 1 |
| 23 | D9 | D10 | 1 | 1 |
| 24 | D11 | Y | 0 | 1 |

BIT COMPRESSION MULTIPLEXING

TECHNICAL FIELD

The present invention relates to digital transmission systems and, more particularly, to a bit compression multiplexing technique.

BACKGROUND OF THE INVENTION

The first step in understanding a transmission system is to define the basic broadband transmission unit. For analog systems, this would be a channel group, which prior to transmission is typically multiplexed into supergroups and mastergroups. For digital transmission, the basic unit is the digroup (digital group) carried in the DS1 signal. The DS1 signal developed by a digital channel bank (e.g., the D-3 Channel Bank, as disclosed in U.S. Pat. No. 4,059,731, issued Nov. 22, 1977 to J. H. Green and J. E. Landry) and transmitted over a T-1 transmission line (1.544 megabits per second) is, at present, the workhorse of the digital transmission network.

The format of the DS1 digital signal consists of 24 eight-bit words and one framing bit for a total of 193 bits per frame. The 24 words typically represent 24 separate and distinct messages deposited in 24 separate and distinct channels. The words are PCM (pulse code modulation) encoded and the least significant bit (i.e., eighth bit) of a channel is periodically dedicated (every sixth frame) for signaling purposes.

Now over the past several years there has been increasing interest in achieving a more efficient digital encoding. For an evolving digital network, a most interesting application is the possible replacement of the 64,000 bit-per-second (bps) PCM signal (8 bits per channel, repeated at an 8 kHz rate) for telephony. The reason, of course, is to achieve bandwidth compression, and thus a concomitant increase in transmission capacity. To this end, the patent application of D. W. Petr, Ser. No. 343,355 filed Jan. 27, 1982, now U.S. Pat. No. 4,437,087 issued Mar. 13, 1984, discloses an efficient, robust, bit compression algorithm. In accordance with the Petr invention, each 64 Kbps (DSO) signal is converted or compressed to a 32 Kbps signal thereby doubling the capacity of a T1 line, for example.

While the Petr coding algorithm reduces the bit rate for the DSO (64 kbps) channels by half, the bit rate required for signaling is potentially doubled since the number of channels to be carried on a specific facility is potentially doubled. In the DS1 digital signal the last significant bit of a channel is periodically preempted for signaling purposes with little degradation in performance. However, periodic preemption of one of the four bits of a 32 kbps coded channel could significantly impair performance. Furthermore, many of the applications which could use 32 kbps coded channels require that the signal be compatible with network switching elements such as the Digital Access and Cross-connect System (DACS), which have the capability of switching or cross-connecting DSO channels (or integral multiples thereof) while maintaining the association of the message channel and signaling therein.

DACS was designed to operate on a DSO channels and the signaling scheme described previously. The introduction of 32 kbps channels in networks containing DACS poses a compatability problem, the solution of which falls to the equipment which implements the 32 kbps coding.

The CCITT A-Law System adopted by most European administrations has a digital signal format that consists of 30 service channels, one channel devoted to framing bits together with alaram bits, and one channel devoted to signaling. Here again, however, to increase the transmission capacity of this digital signal would result in a signaling problem due to the increased bandwidth required for signaling associated with the added channels.

One arrangement that employs a bit compression multiplexing technique is disclosed in the patent application of D. Galensky and W. G. Hammett, Ser. No. 496,199 filed May 19, 1983. That bit compression multiplexing technique is for a pair of time division multiplexed digital bit streams each one of which includes a plurality of PCM encoded signals deposited in separate and distinct channels of a repetitive frame and signaling bits multiplexed therewith. The encoded signals are bit compressed, and then multiplexed and grouped into clusters. Each of the multiplexed compressed signals occupies a separate and distinct channel of a repetitive frame that includes a plurality of clusters and a corresponding number of additional channels each one of which is associated with a given cluster and is proximate thereto. The signaling bits are extracted from the pair of digital bit streams, reformatted, and then placed in predetermined ones of the additional channels. The signaling bits in a given channel are associated with the compressed signals of a cluster proximate thereto. A framing bit pattern is developed for each additional channel and the framing bits are placed into a predetermined bit position of each of the additional channels.

One problem with this prior bit compression arrangement is that the framing bit pattern employed does not cause the framer in a corresponding bit compression multiplexer (BCM) receiver to reframe when a so-called frame slip occurs between a transmitting BCM and the receiving BCM. The frame slip may occur at the transmitting BCM, at the receiving BCM or at some other apparatus in the transmission system between them, for example, at a DACS.

Thus, although the prior arrangement may function satisfactorily in some applications, it functions unsatisfactorily in others.

SUMMARY OF THE INVENTION

Frame slips at a transmitting bit compression multiplexer (BCM), at a receiving BCM or at other apparatus in the transmission system between them are detected in a receiving BCM by employing a framing bit pattern having an alternating bit pattern except at at least one prescribed location where at most two adjacent bit positions are identical.

In a specific embodiment of the invention, at least two sub-framing bit patterns are employed each having an alternating bit pattern wherein the bit pattern of one of the sub-framing patterns alternates in inverse fashion relative to the alternating pattern of the other sub-framing pattern resulting in an overall framing bit pattern having at most two identical adjacent bit positions at each of the sub-framing bit pattern boundaries.

BRIEF DESCRIPTION OF THE DRAWING

The invention will be more fully appreciated from the following detailed description when the same is considered in connection with the accompanying figures in which.

DETAILED DESCRIPTION

Figure 1:
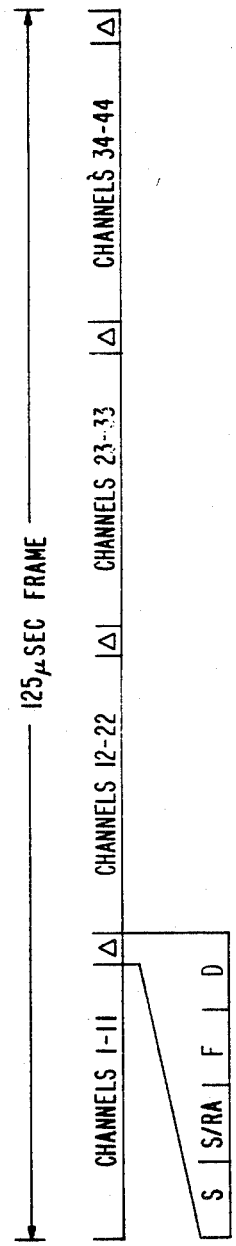
FIG. 1 illustrates the format of a bit compressed multiplexed signal including the bundle framing bit pattern in accordance with the present invention.

FIG. 1 shows a bit compressed, multiplexed, digital signal format, employing a framing bit pattern in accordance with the invention, which is compatible (at the bundle level) with network switching elements (such as DACS) and is completely transparent to signaling. The FIG. 1 format is achieved by bit compressing and multiplexing a pair of DS1 signals and grouping the multiplexed compressed signals into clusters. An additional channel, hereinafter called a delta (Δ) channel, is proximate to each cluster and is used for bundle-signaling, bundle-framing, and bundle-alarm. The combination of a cluster and its related delta channel is called a bundle. While the present invention will be described in the context of bit compressing and multiplexing two DS1 signals, the invention is not so limited. As will become apparent to those skilled in the art, the inventive concepts herein disclosed can be applied to other digital transmission systems which utilize other and different formats (e.g., the CCITT A-Law Format).

Returning to the showing in FIG. 1, each of the aforementioned clusters comprises eleven 4-bit digitally encoded message signals deposited in separate and distinct channels. A delta channel is associated with each cluster and is proximate thereto. A frame (125 μsec) comprises a plurality (e.g., 4) of cluster/Δchannel bundles. Like the message channels, each delta channel consists of four bits. The first two bit positions, i.e., bits 0 and 1, of a delta channel are used for signaling purposes, with the second bit position periodically used for alarming purposes. The third bit position, i.e., bit 2, of each delta channel is used for framing, with the last bit position, i.e., bit 3, providing a low bit rate data link, if desired. These bit position assignments are more or less arbitrary and can, of course, be changed. The signaling bits of a delta channel carry the signaling information for the preceding eleven message channels; the framing bit information is for the assignment of receiving signaling to the proper message channels and for causing a receiving BCM to reframe in the event of frame slips at the transmitting BCM, at the receiving BCM or at other apparatus in the transmission system between the transmitting and receiving BCMs; the periodically occurring alarm bits are used to transmit a bundle-yellow alarm to a remote location (similar to a channel bank yellow alarm); and, the data link bit(s) can be used to send maintenance information, for example.

Figures 3, 5:
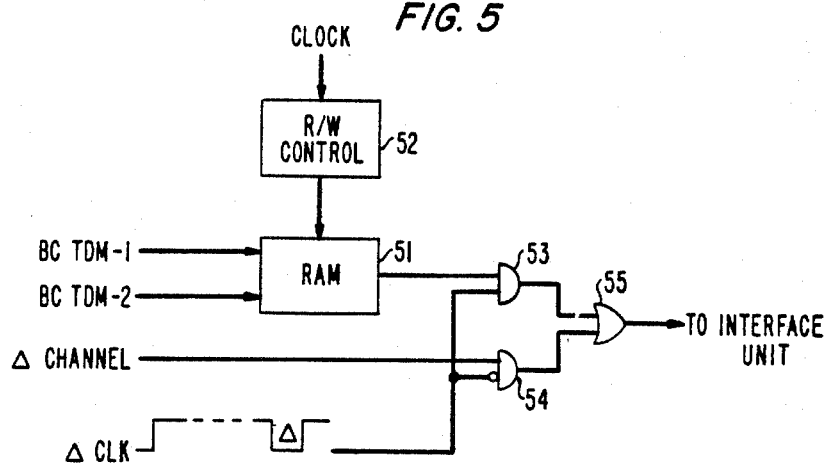
FIG. 3 illustrates the format of the delta (Δ) channel shown in FIG. 1 including a framing bit pattern in accordance with the invention.
FIG. 5 is a simplified schematic diagram of a means for multiplexing the compressed signals and delta channel(s) into the FIG. 1 format.

FIG. 3 illustrates in greater detail the delta channel format including a framing bit pattern in accordance with the invention. It is contemplated that the invention will be utilized in connection with the known extended superframe format of 24 frames, as disclosed for example in U.S. Pat. No. 4,397,020 issued to R. D. Howson on Aug. 2, 1983. The horizontal row associated with each of these 24 frames contains the content of the four delta channel bits in that frame. Sixteen state signaling, employing four signaling bits (A, B, C and D), is assumed. The letters in FIG. 3, therefore, refer to a signaling bit (A, B, C or D) and the numbers adjacent thereto refer to the related message channel in the cluster (ranging from 1 to 11). Accordingly, the delta channel of frame No. 1 carries the A signaling bits for the first and second channels of the associated cluster; the delta channel of frame No. 2 carries the A signaling bits for the third and fourth channels of the cluster, and so on. And, by way of further explanation, the designated A1, B1, C1 and D1 signaling bits carry the 16-state signaling for the first channel of the associated channel cluster.

The second bit position of a delta channel (bit 1 (S/RA) of FIG. 3) is preempted or used at regular intervals for remote alarm (RA) purposes; this bit position is designated by the letter Y. The third bit position (bit 2 (F) in FIG. 3) is used for bundle-framing purposes. The last bit position of a delta channel (bit 3 (D) in FIG. 3) can be used as a low bit rate data link for the transmission of maintenance information, for example. In this embodiment, the last bit position is not used and is filled with logical 1's.

The framing bit pattern shown in FIG. 3 although relatively simple is robust and has the advantage of causing detection of frame slips occurring at the transmitting BCM, at the receiving BCM or at the apparatus in between the transmitting and receiving BCMs. Any of a number of new framing bit patterns in accordance with the invention can be used for this purpose. It should also be noted that the compliment of the framing bit pattern shown in FIG. 3 effects the same desired results.

For a bundle with less than eleven active message channels the available signaling bit positions in the delta channel are simply not used. The same is true of the Y bit positions if a yellow-alarm condition is not called for. For 4-state signaling (A and B signaling bits) the C and D bits of the delta channel are replaced by updates of A and B.

Figure 2:
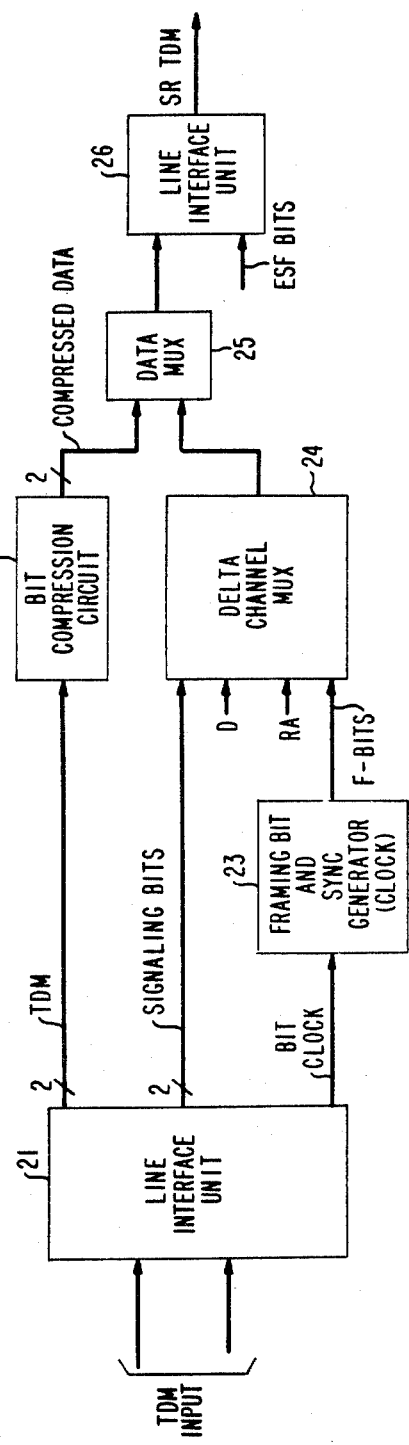
FIG. 2 is a simplified schematic block diagram of a bit compression multiplexer which develops the frame format shown in FIG. 1.

Turning now to the schematic block diagram of FIG. 2, a pair of time division multiplexed (TDM) digital bit streams (e.g., DS1 digroups) are delivered to the line interface unit 21. As the name implies, the interface unit 21 interfaces the bit compression multiplexer (BCM) of FIG. 2 to other equipment. The interface circuitry will typically include an equalizer circuit for the equalization of gain and/or delay distortion, detectors for facility performance monitoring, provision for DS1 loopback for maintenance, bipolar-to-unipolar conversion, etc. The line interface circuitry is conventional in design and its functions well known to those in the art. One circuit pack of interface 21 contains reference clock extraction circuitry which generates a "bit clock" signal from one of the input DS1 signals. Another interface circuit serves to extract the signaling bits of the input DS1 signals; signaling bit extraction is a standard feature of all digital channel banks, for example. The interface unit 21 delivers the pair of TDM signals to the bit compression circuit 22. For convenience and hardware simplicity, the TDM output signals from interface circuit 21 are frame aligned (by buffering).

The circuit 22 serves to bit compress each of the 64 Kbps message signals of the input TDMs to a 32 Kbps signal. The bit compression algorithm of the cited Petr application can be advantageously used for this purpose. For example, a pair of coders such as disclosed in the Petr case can be used to respectively bit compress the 64 Kbps signals of each TDM bit stream. The compressed data (i.e., the bit compressed TDMs) is delivered to the multiplexer 25.

The synchronization generator (or BCM system clock) 23 is "slaved" to the network timing provided by the aforementioned reference clock extraction circuit. A local phase-locked loop (PLL) of generator 23 locks its oscillator to the 1.544 Mhz line clock. The sync generator circuit generates the local clocks and tailored synchronization signals required by the various functions of the FIG. 2 system. The generator 23 also includes apparatus as described below for generating the bundle-framing bits (F-bits) in a pattern, in accordance with the invention, as shown in FIG. 3.

The signaling bits from interface 21 and the framing bits from generator 23 are delivered to the delta channel multiplexer 24 along with remote alarm (RA) bits, if an alarm condition exists, and data (D) bits if low bit rate data is to be transmitted. The remote alarm bits are generated by a framer (not shown) in response to a detected bundle out-of-frame condition, and the data bits may be generated by a data set (not shown). In this example, an out-of-frame condition is declared when two out of four consecutive framing bits are in error. The multiplexer 24 combines or multiplexes these bits in the manner illustrated in FIG. 3. This bit multiplexing operation is relatively straightforward and can be carried out in one of several ways.

Figure 4:
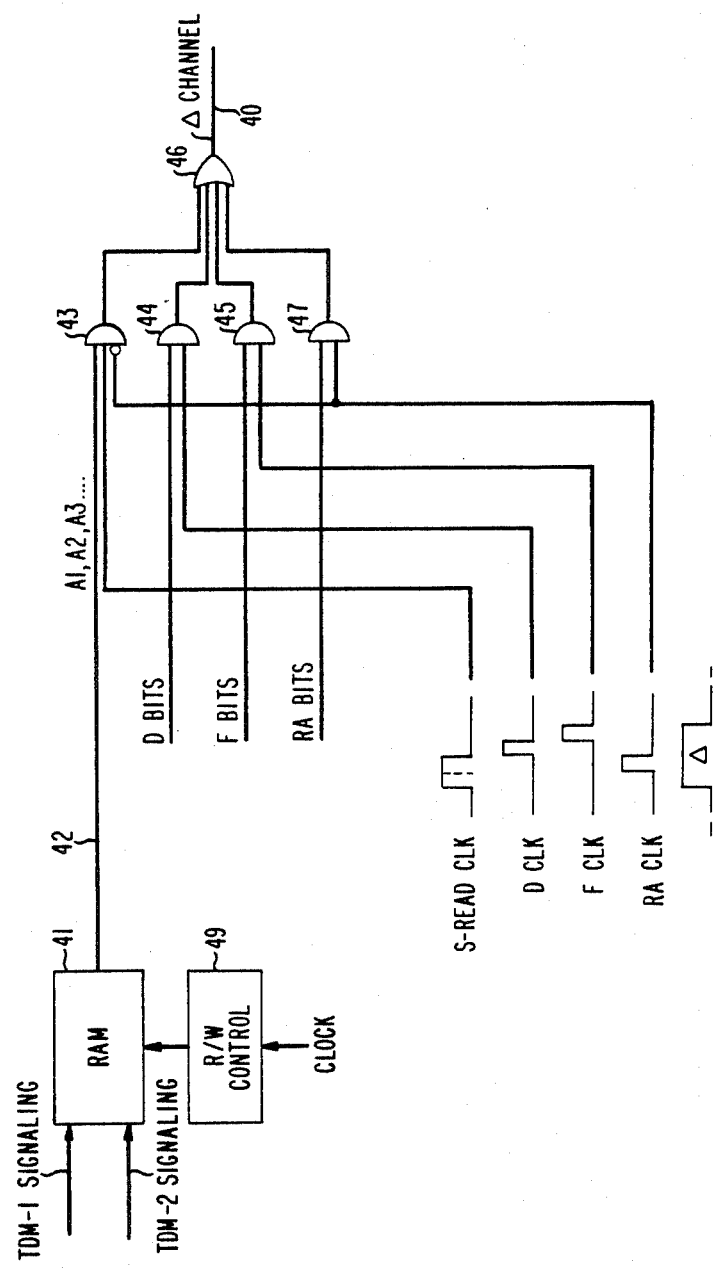
FIG. 4 is a schematic diagram of a delta channel multiplexer.

FIG. 4 is a simplified showing which illustrates this multiplexing operation. The signaling bits are written into respective storage locations of the randomaccess-memory (RAM) 41. These storage locations are then accessed in a predetermined manner so that the signaling bits on the RAM output lead 42 correspond to the desired format; i.e., the A signaling bits for the bundle-channels 1 through 11 appear in sequence on lead 42, followed by the B signaling bits, etc. Thus, the RAM 41 serves the function of reformatting the signaling bits. However, the signaling bits are not changed or altered in any way.

As each signaling bit stored in RAM is accessed and read out, the AND gate 43 is enabled by an S-read clock signal generated by sync generator 23. In this manner, a pair of signaling bits are read out of RAM and coupled to the Δ channel output lead 40 via the enabled gate 43 and OR gate 46. Following the read-out of a pair of signaling or S-bits, the AND gate 44 is enabled by a D clock pulse and a data bit (D) is coupled to the lead 40 immediately ater the pair of S-bits. Finally, during the next bit interval, the F clock from sync circuit 23 serves to enable the AND gate 45 and an F-bit is coupled to the lead 40. The RA clock periodically enables the AND gate 47 and inhibits gate 43 so that the second bit position of a delta channel can be used at intervals for alarming purposes. The described operation is repeated four times per frame, during each Δ channel interval. There are, of course, other ways in which the delta channel multiplexing can be carried out and the invention is in no way limited to the specific multiplex implementation shown. For example, instead of the simplified gating arrangement shown in FIG. 4, a state-of-the-art multiplexer could be used. Alternatively, the D, F and RA bits could also be stored in RAM 41 and then read out in the desired multiplexed sequence by read/write control 49.

Returning to FIG. 2, the bit compressed TDMs (i.e., compressed DS1 digroups) are multiplexed with each other and with the delta channel signal(s) in the data multiplexer 25 to achieve the bit compressed multiplexed signal shown in FIG. 1. There are, of course, a number of ways of multiplexing the compressed data signals. For purposes of explanation, it will be assumed that the compressed channels from the two digroups are not mixed when assigned to bundles. In this case, channels 1–22 of FIG. 1 would be dedicated to channels originating from digroup A and channels 23–44 would be dedicated to channels originating from digroup B. Alternatively, the bundles could be assigned compressed channels by interleaving a compressed channel from digroup A followed by a channel from digroup B, for example. Still other multiplexing arrangements should be readily apparent.

FIG. 5 shows an arrangement which could be used to perform the compressed data-delta channel multiplexing. The bit compressed, time division multiplexed signals (BC TDM) are written into storage locations in random access memory 51 under R/W control 52. These storage locations are accessed in a predetermined manner, also controlled by the R/W control 52, to assemble each cluster from compressed channels originating from a single digroup. Other forms of cluster assemble are easily envisioned. A simple gating arrangement, shown in FIG. 5, could be used to append the delta channel to a cluster of 11 compressed channels. When the delta channel clock or Δ clock is high, AND gate 53 is enabled, permitting the compressed channels to be delivered to the interface unit through the OR gate 55. At the same time, the Δ clock inverted disables AND gate 54, blocking the insertion of the delta channel. When the delta channel clock goes low, AND gate 53 is disabled, blocking the compressed channel data; AND gate 54 is enabled, permitting the delta channel to be delivered to the interface unit through the OR gate 55. Here again, the circuit arrangement of FIG. 5 is merely exemplary and this mutliplexing can be implemented in other ways.

Figure 6:
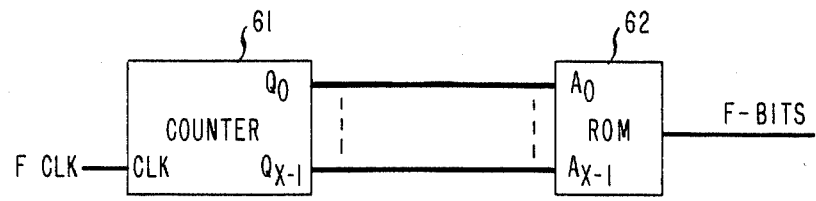
FIG. 6 is a simplified block diagram of one framing bit generator that generates the bundle framing bit pattern shown in FIG. 3.
Figure 7:
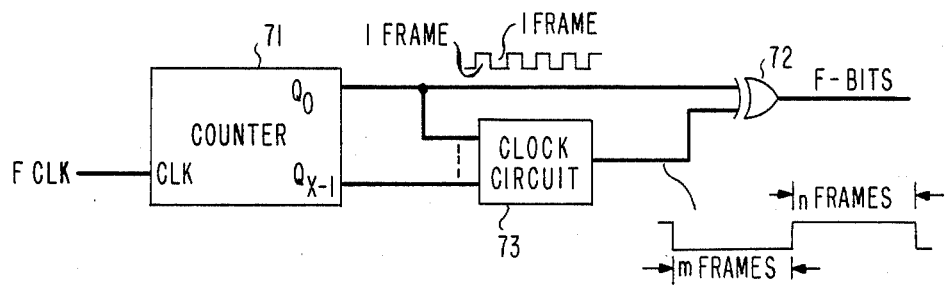
FIG. 7 is a simplified block diagram of another framing bit generator that can generate the bundle framing bit pattern shown in FIG. 3.

FIGS. 6 and 7 show in simplified block diagram form arrangements which may be employed to generate the bundle framing bit pattern shown in FIG. 3. This framing bit pattern is of the form:

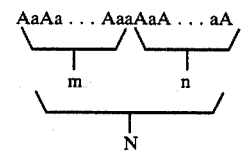

wherein

A is a logical 1 or 0, a is $\overline{A}$ (e.g., if A=0 then a=1),

N is the frame length, (i.e., number of frames m+n for N even), m is a sub-framing pattern and is an integer divisible by 2, and n is another sub-framing pattern and is also an integer divisible by 2.

In this example, not to be construed as limiting the scope of the invention N=24, A is a logical 0, a is a logical 1 and m=n=12. Consequently, the pattern AA occurs only at frame boundaries.

If an odd number of frames is used then a framing bit pattern maybe employed having alternating logical 1's and 0's except at the frame boundaries where at most two adjacent bits are either 0's or 1's.

Accordingly, FIG. 6 shows one arrangement for generating the framing bit pattern of FIG. 3 which is employed in the framing bit and sync generator (clock) 23 of FIG. 2. The F CLK signal generated in unit 23 is supplied to counter 61 which generates appropriate addresses for ROM 62 in well known fashion. ROM 62 is an Nx1 read only memory which includes in appropriate memory locations the framing bit pattern of FIG. 3. Thus, outputs $Q_0$ through $Q_{x-1}$ from counter 61 are supplied to address inputs $A_0$ through $A_{x-1}$, respectively, and cause the bundle framing bits (F-Bits) to be generated at an output of ROM 62. Counter 61 counts 0 to N-1 where $(2^x \geq N)$. In this example, N=24, x=5 and ROM 62 has stored the pattern shown in FIG. 3.

FIG. 7 shows in simplified block diagram form another arrangement for generating the framing bit pattern shown in FIG. 3. Accordingly, the F CLK signal generated in framing bit and sync generator (clock) 23 is supplied to counter 71 for generating appropriate outputs $Q_0$ through $Q_{x-1}$. Output $Q_0$ having a logical 1,0 waveform which alternates each frame as shown, is supplied to one input of exclusive OR gate 72. Outputs $Q_0$ through $Q_{x-1}$ are supplied to clock circuit 73 which generates in well known fashion an alternating waveform as shown having a first interval representative of a logical 1 m frames in duration and s second interval representative of a logical 0 n frames in duration. This m,n waveform is supplied to a second input of Exclusive OR gate 72. Exclusive OR gate 72 operates in well known fashion in response to the supplied waveforms to generate the F-bits. In this example, N=24, x=5 and m=n=12 and the F-bit pattern shown in FIG. 3 is generated.

The interface unit 26 (FIG. 2) interfaces the bit compression multiplexer to the transmission network. It performs a number of known conventional functions, such as unipolar to bipolar conversion, as well as the addition of the extended superframe (ESF) bits to the outgoing time division multiplexed digital bit stream.

Each cluster of message channels and its related delta channel comprise a bundle that can be readily handled (i.e., switched) by the existing equipment; that is, the bundles are DACS compatible. Since each bundle, in effect, corresponds to an integral number of DSO channels, it can be cross-connected or switched via DACS. Each bundle is totally independent from the other bundles of the sub-rate TDM signal. This permits the bundles to be independently networked; the four bundles leaving one bit compression multiplexer can be sent to four different bit compression demultiplexers.

Digital data (e.g., 56 Kbps data) may be integrated with voice channels in a bundle to add further network capability. In this case, a 64 Kbps channel is inserted or used in place of sub-rate channels 1 and 2, for example. Since digital data must not be bit compressed, the coder 22 is made transparent to digital data—i.e., the coder is temporarily placed in a by-pass mode for digital data.

Two full-rate DS1s can supply 48 DSO channels of which only 44 can be compressed onto the sub-rate DS1. The other four channels are not transmitted. However, it is not likely, particularly for use of the invention for private line purposes, that all 24 channels of each DS1 will be active at any given time.

It must be understood at this point that the foregoing disclosure is merely illustrative of the principles of the present invention and numerous modifications or alterations may be devised by those skilled in the art. For example, if an odd number of frames are used an alternating framing bit pattern may be employed having at most 2 bit positions identical at the frame boundaries.

Additionally, although this embodiment of the invention is described in the context of a transmitting BCM it should be apparent to those skilled in the art that a receiving BCM must perform inverse functions of the transmitting BCM to recover the transmitted signals. For example, decoders corresponding to those described in the Petr application may be employed. Moreover, the receiver includes apparatus for generating the framing bit pattern of the invention which must be compared in well known fashion with the transmitted framing bit pattern. Additionally, by using the framing bit pattern of the invention, the frame boundaries are easily detectable since the bit pattern AA only occurs at the boundaries. This AA bit pattern is readily detected by using a D-type flip-flop and an AND gate (not shown) in a manner which will be apparent to those skilled in the art.

It is noted that by employing the simple but robust framing bit pattern of the invention an out-of-frame condition is declared in this example after receiving at most three additional framing bits after the out-of-frame condition occurs. Typically, the out-of-frame condition is declared after receiving only two additional framing bits.

What is claimed is:

1. A bit compression multiplexing system for a pair of time division multiplexed digital bit streams each of which includes a plurality of PCM encoded signals deposited in separate and distinct channels of a repetitive frame and signaling bits multiplexed therewith comprising:

means for bit compressing the encoded PCM signals into differential PCM signals;

means for multiplexing the compressed differential PCM signals and grouping the same into clusters, each of the clusters including a predetermined number of multiplexed compressed signal channels and each of the compressed differential PCM signals occupying a separate and distinct channel of a repetitive frame that includes a plurality of said clusters and a corresponding plurality of additional channels each one of which is associated with a given cluster and is proximate thereto, wherein a predetermined number of said repetitive frames forms a repetitive superframe;

means for extracting and reformatting the signaling bits of said time division multiplexed digital bit streams and placing the same in predetermined ones of said plurality of additional channels in the repetitive frames of said superframe, the signaling bits in a given additional channel being associated with the compressed differential PCM signals of a cluster proximate thereto; and means for developing a framing bit pattern for each of said plurality of clusters and for inserting the bits of the same into a predetermined repetitive bit position of each of said additional channels in the repetitive frames of said superframe, said framing bit pattern having an alternating bit pattern except at at least one prescribed location where at most two adjacent bit positions are identical.

2. A bit compression multiplex system as defined in claim 1 wherein said framing bit pattern prescribed location is at the framing pattern boundary.

3. A bit compression multiplex system as defined in claim 1 wherein said framing bit pattern includes at least two sub-framing bit patterns each having an alternating bit pattern wherein the bit pattern of one of said sub-framing bit patterns alternates in inverse fashion relative to the alternating bit pattern of the other sub-framing bit pattern.

4. A bit compression multiplex system as defined in claim 3 wherein said sub-framing bit patterns form an overall framing bit pattern having at most two adjacent bit positions identical at the sub-framing bit pattern boundaries.

5. A bit compression multiplex system as defined in claim 4 wherein said sub-framing bit patterns each have a prescribed number of framing bits in predetermined relationship to the total number of framing bits.

6. A bit compression multiplex system as defined in claim 5 wherein the relationship is $N = m + n$ where $N$ is the total number of framing bits, $m$ is the number of framing bits in one sub-framing bit pattern and $n$ is the number of framing bits in the other sub-framing bit pattern.

7. A bit compression multiplex system as defined in claim 6 wherein N is twenty-four (24), m is twelve (12) and n is twelve (12).

8. A bit compression multiplex system as defined in claim 7 wherein the framing bit pattern is

010101010101101010101010 where 0 is a logical 0 and 1 is a logical 1.

9. A bit compression multiplex system as defined in claim 7 wherein the framing bit pattern is

101010101010010101010101 where 1 is a logical 1 and 0 is a logical 0.

10. A bit compression multiplex system as defined in claim 9 wherein the digital bit streams are DS1 signals.

11. A bit compression multiplexing method for a pair of time division multiplexed digital bit streams each of which includes a plurality of PCM encoded signals deposited in separate and distinct channels of a repetitive frame and signaling bits multiplexed therewtih comprising the steps of:

bit compressing the encoded PCM signals into differential PCM signals;

multiplexing the compressed differential PCM signals and grouping the same into clusters, each of the clusters including a predetermined number of multiplexed compressed signal channels and each of the compressed differential PCM signals occupying a separate and distinct channel of a repetitive frame that includes a plurality of said clusters and a corresponding plurality of additional channels each one of which is associated with a given cluster and is proximate thereto, wherein a predetermined number of said repetitive frames forms a repetitive superframe;

extracting the signaling bits from the pair of time division multiplexed digital bit streams;

reformatting the extracted signaling bits and placing the same in predetermined ones of said plurality of additional channels in the repetitive frames of said superframe, the signaling bits in a given additional channel being associated with the compressed differential PCM signals of a cluster proximate thereto;

and developing a framing bit pattern for each of said plurality of clusters and inserting the bits of the same into a predetermined repetitive bit position of each of said additional channels in the repetitive frames of said superframe, said framing bit pattern having an alternating bit pattern except at at least one prescribed location where at most two adjacent bit positions are identical.

12. The method as defined in claim 11 wherein said framing bit pattern includes at least two sub-framing bit patterns each having an alternating bit pattern wherein the bit pattern of one of said sub-framing bit patterns alternates in inverse fashion relative to the alternating bit pattern of the other sub-framing bit pattern forming an overall framing bit pattern having at most two adjacent bit positions identical at the sub-framing bit pattern boundaries.

* * * * *